(12) United States Patent
Tian

(10) Patent No.: US 7,496,720 B2
(45) Date of Patent: *Feb. 24, 2009

(54) ROM ADDRESSING METHOD FOR AN ADPCM DECODER IMPLEMENTATION

(75) Inventor: Lijun Tian, Shenzhen (CN)

(73) Assignee: Shenzhen STS Microelectronics Co. Ltd. (CN)

( * ) Notice: Subject to any disclaimer, the term of this patent is extended or adjusted under 35 U.S.C. 154(b) by 28 days.

This patent is subject to a terminal disclaimer.

(21) Appl. No.: 11/713,340

(22) Filed: Mar. 2, 2007

(65) Prior Publication Data

US 2007/0153919 A1    Jul. 5, 2007

Related U.S. Application Data

(63) Continuation of application No. 10/033,204, filed on Dec. 26, 2001, now Pat. No. 7,191,301.

(30) Foreign Application Priority Data

Dec. 29, 2000    (CN) ................. 00 1 37177

(51) Int. Cl.
*G06F 12/00* (2006.01)
(52) U.S. Cl. ...................... 711/154; 375/242
(58) Field of Classification Search ................ 711/167, 711/157; 375/242, 244, 241, 145, 342, 240.26
See application file for complete search history.

(56) References Cited

U.S. PATENT DOCUMENTS 4,703,477 A   10/1987   Adelmann et al.
5,105,387 A   4/1992    Childers et al.
5,144,242 A   9/1992    Zeilenga et al.
5,319,573 A   6/1994    Corleto et al.
5,524,008 A   6/1996    Levy et al.
5,764,941 A   6/1998    Goto et al.

(Continued)

FOREIGN PATENT DOCUMENTS

JP    09074377 A    3/1997

OTHER PUBLICATIONS

Intel MCS®-51 Architectural Overview, pp. 1-18 through 1-21, dated unknown.

(Continued)

*Primary Examiner*—Pierre-Michel Bataille
(74) *Attorney, Agent, or Firm*—Lisa K. Jorgenson; Andre M. Szuwalski

(57) ABSTRACT

A micro-controller is connected between a hardware-based adaptive differential pulse code modulation (ADPCM) decoder and a read only memory (ROM) storing both micro-controller programming instructions and ADPCM encoded source file data. A micro-controller architecture implements time multiplexed ROM addressing driven by a two phase clock signal. In an instruction phase, a program counter supplies ROM address(es) for retrieving micro-controller programming instructions. In a decoder phase, an address counter supplies ROM address(es) for retrieving portions of the ADPCM encoded source file data. ADPCM encoded source file data extracted from the ROM in the decoder phase of the clock signal is delivered to the decoder for processing during the subsequent instruction phase of the clock signal. The selection between program counter and address counter supplied addresses for application to the ROM is made by a two phase clock signal driven multiplexer.

19 Claims, 2 Drawing Sheets

U.S. PATENT DOCUMENTS 5,799,010 A    8/1998   Lomp et al.
5,925,146 A *  7/1999   Murata et al. ............... 714/746
5,931,952 A    8/1999   Lesmeister
5,978,762 A *  11/1999  Smyth et al. ................ 704/229
6,487,535 B1 * 11/2002  Smyth et al. ................ 704/500
6,615,166 B1   9/2003   Guheen et al.

OTHER PUBLICATIONS

Holtek Semiconductor Inc., HT85XXX Green Voice™, pp. 1-11, dated Aug. 24, 2000.

* cited by examiner

ROM ADDRESSING METHOD FOR AN ADPCM DECODER IMPLEMENTATION

CROSS REFERENCE TO RELATED APPLICATIONS

This Application is a Continuation of U.S. patent application Ser. No. 10/033,204 filed Dec. 26, 2001, now U.S. Pat. No. 7,191,301 issued Mar. 13, 2007, the disclosure of which is hereby incorporated by reference, which claims priority from Peoples Republic of China Application for Patent No. 00137177.0 filed Dec. 29, 2000.

BACKGROUND OF THE INVENTION

1. Technical Field of the Invention

The present invention relates to the decoding of adaptive differential pulse code modulation (ADPCM) encoded signals and, in particular, to a time multiplexed method for addressing a read only memory (ROM) that stores both ADPCM encoded source files and micro-controller operational instructions.

2. Description of Related Art

Applications needing speech synthesizers and/or tone generators are well known in the art. Examples of such applications include high-end educational toys, alert and warning systems, speech generators, and sound effect generators. It is common in such applications to store the voice data (i.e., the speech/sound/tone source file) in read only memory (ROM) in a pulse code modulation (PCM) format. The audible information comprising the speech, sound or tone may then be synthesized from the data in the ROM addressed source file and output for listening.

A concern exists, however, that even though PCM source files produce high quality output synthesized sound, these files (when stored) tend to take up an unacceptably large amount of ROM space. This is especially a concern in product applications where the total amount of available ROM space is severely limited (perhaps because of integrated circuit size restrictions or price considerations). In these situations, given a fixed ROM space, the relatively large size of the resulting source file severely limits the length of the audible voice data output that may be produced.

It is also recognized that in some product applications a higher quality output synthesized sound like that produced from PCM source files may not be required. Also, these applications may require the generation of a longer audible voice data output that cannot be achieved with PCM stored source files saved in limited ROM space. To address both of these concerns, the prior art teaches encoding the PCM source file instead in an adaptive differential pulse code modulation (ADPCM) format. This format advantageously uses approximately one-half the amount of ROM storage space to save the source file as that which is needed for conventional PCM files. This savings in storage space is made at the expense of some level of audible quality, but advantageously allows the user to generate a much longer synthesized sound output than is possible for PCM data saved in the same size ROM space.

Reference is now made to FIG. 1 wherein there is shown a block diagram of a conventional software-based ADPCM decoder. The decoder is typically implemented in a micro-controller unit (MCU), microprocessor unit (µP), or other intelligent processing device such as an application specific integrated circuit (ASIC), with the ADPCM decoding algorithm implemented in software instructions executed by the processing device. In accordance with one well known algorithm (as proposed by the Interactive Multimedia Association (IMA)), $C(n)$ represents the ADPCM compressed data (i.e., the source file) as extracted from ROM memory (not shown). The compressed data is adaptatively dequantized to generate data $Dq(n)$. The dequantized compressed data $Dq(n)$ is summed with a predicted value $Xp(n-1)$ of the compressed data $(C(n))$ obtained from a previous sample to produce the output decoded data $Xp(n)$. In this feedback configuration, the data $Xp(n-1)$ represents the predicted value of the compressed data $(C(n))$ from the previous sample, and is generated by a predictor from the summer output predicted value $Xp(n)$.

A number of drawbacks are recognized with this software based implementation for ADPCM decoding. First, with the ADPCM algorithm implemented in software, the processing device must execute many addition, shift and compare instructions in the period of one sample (n) of the data, and hence device operation may be slowed. Second, it takes a large amount of ROM space to store the ADPCM decoding algorithm (even though the encoded ADPCM source file may take up less space than a comparable PCM file). This may eliminate much of the ROM space gain achieved by switching from PCM to encoded ADPCM source files. Third, the processing unit typically cannot perform two things at one time and thus it cannot be interrupted to perform another action while the ADPCM decoding process is being implemented on a given source file.

What is needed is an ADPCM decoder system possessing quick execution time and that can take advantage of the ROM-based savings ADPCM format without needing to also store the decoding algorithm. Still further, there would be an advantage if the process for decoding a retrieved source file could be interrupted to allow the processor to handle other tasks.

SUMMARY OF THE INVENTION

In an embodiment, a circuit comprises a hardware-based adaptive differential pulse code modulation (ADPCM) decoder, a memory storing both programming instructions and ADPCM encoded source file data, and a micro-controller responsive to a state of a control signal to control addressing of the memory. The micro-controller operates to extract ADPCM encoded source file data from the memory for delivery to the ADPCM decoder for processing when the control signal is in a first logic state and operates to extract programming instructions from the memory for execution by the micro-controller when the control signal is in a second logic state while the hardware-based ADPCM decoder continues processing of the previously extracted ADPCM encoded source file data.

In another embodiment, a method for addressing of a memory storing both programming instructions and adaptive differential pulse code modulation (ADPCM) encoded source file data comprises: extracting ADPCM encoded source file data from the memory for delivery to, and processing by, an ADPCM decoder when a control signal is in a first logic state; and extracting programming instructions from the memory for execution by a processor when the control signal is a second logic state and while the ADPCM decoder continues processing of previously extracted ADPCM encoded source file data.

In another embodiment, a programming architecture for a micro-controller connected to a memory storing both programming instructions and adaptive differential pulse code modulation (ADPCM) encoded source file data comprises: a program counter storing a first memory address relating to a micro-controller programming instruction; an address counter storing a second memory address relating to a portion of the ADPCM encoded source file data; a multiplexer receiving a control signal and the first and second memory addresses and operating to select the first memory address for application to the memory when the control signal is in a first logic state and select the second memory address for application to the memory when the control signal is in a second logic state.

Generally speaking, the present invention comprises a micro-controller connected between a hardware-based adaptive differential pulse code modulation (ADPCM) decoder and a memory storing both programming instructions for controlling micro-controller operation and ADPCM encoded source file data. The micro-controller responds to a control signal to implement memory addressing. In a first logic state of the control signal, ADPCM encoded source file data is extracted from the memory and delivered to the ADPCM decoder for processing. In a second logic state of the control signal, programming instructions are extracted from the memory and executed by the micro-controller while the hardware-based ADPCM decoder continues processing of the previously extracted ADPCM encoded source file data.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
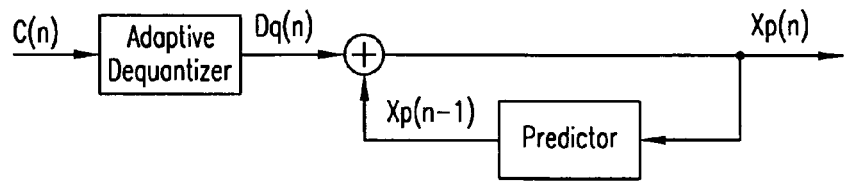
FIG. 1, previously described, is a block diagram of a conventional software-based adaptive differential pulse code modulation (ADPCM) decoder.
Figure 2:
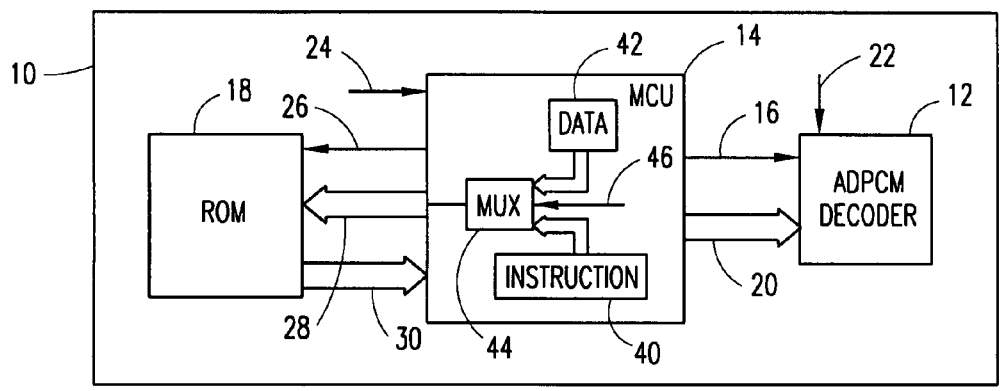
FIG. 2 is a block diagram of an integrated circuit chip including a hardware-based ADPCM decoder.

Reference is now made to FIG. 2 wherein there is shown a block diagram of an integrated circuit chip 10 including a hardware-based ADPCM decoder 12. The chip 10 may implement any application needing a speech synthesizer and/or a tone generator. Examples of such applications include high-end educational toys, alert and warning systems, speech generators, and sound effect generators. The hardware-based ADPCM decoder 12 is connected to a micro-controller unit (MCU) 14. In this configuration, the ADPCM decoder 12 is tailor-made as a hardware function block to independently implement a certain algorithm for performing ADPCM decoding/synthesis. Independent implementation in this context refers to a decoder 12 operation wherein the micro-controller unit 14 does not implement or assist in the implementation or execution of the ADPCM decoding algorithm. Instead, the decoding operation itself is completely performed within the hardware-based decoder 10 itself. Examples of such hardware implemented ADPCM decoders 12 may be found in a number of available chip products including the ADPCM decoders/synthesizers manufactured by companies such as STMicroelectronics, Holtek, Winbond, Sonic, and the like. These hardware-based decoders have a configuration and decoding operation well known to those skilled in the art.

The micro-controller unit 14 asserts an enable signal 16 to activate operation of the ADPCM decoder 12 and further feeds the raw (i.e., ADPCM encoded) source file data extracted from a read only memory (ROM) 18 to the decoder 12 over a data bus 20. The decoder 12 also receives a clock signal (ck_sac) 22 to assist in timing decoder operations wherein it functions to decode the received source file and outputs decoded source file data (for example, in linear PCM data format) on the output bus (not explicitly shown) for the decoder 12. The micro-controller unit 14 similarly receives a clock signal (clk_mcu) 24, which may have a different frequency and/or phase than the decoder clock signal 22, to assist in timing controller operations.

The ROM 18 stores both the user programming data relating to the operation of the micro-controller unit 14 and the ADPCM encoded source file data (preferably together in a mask ROM structure). It should be noted here that the user programming data comprises an instruction for micro-controller unit 14 operation typically presented in the format of an opcode plus any necessary operands. A select signal (rom_cs) 26 may be asserted by the micro-controller unit 14 on the ROM 18 to access the memory. When in that mode, the micro-controller unit 14 asserts a memory address on address bus 28, and retrieves from the addressed memory location over data bus 30 the requested stored data (which again may comprise either user programming data or ADPCM encoded source file data).

The micro-controller unit 14 implements a time multiplexed ROM addressing method in accordance with the present invention. The address applied by the micro-controller unit 14 to the ROM on bus 28 is obtained from either a processor instruction address block 40 or an ADPCM source file data address block 42. A multiplexer (MUX) 44 selectively chooses which of the two blocks 40 and 42 is to supply the ROM address and, more particularly, alternates back and forth between processor instruction address block 40 supplied address(es) and ADPCM source file data address block 42 supplied address(es) in accordance with, and with a frequency specified by, a clock signal (ck_6k) 46 which may have a different frequency and/or phase than the clock signals 22 and/or 24. Specifically, in an instruction cycle when the clock signal 46 is logic high, the processor instruction address block 40 supplies the address(es) and stored user programming data relating to micro-controller unit operation is retrieved from ROM 18 (over bus 30). This programming data is then executed by the micro-controller unit 14. When the clock signal 46 is logic low in a decoder cycle, on the other hand, the ADPCM source file data address block 42 supplies the address(es) and stored pieces of the ADPCM encoded source file data are retrieved from ROM 18 (over bus 30). This ADPCM source file data is then fed by the micro-controller unit 14 to the ADPCM decoder 12 for decoding. The two cycles of the time multiplexed ROM addressing method consecutively repeat for as long as is needed to allow all ADPCM source file data to be extracted and delivered to the decoder for processing, while allowing for some nature of simultaneous (i.e., inter-mixed) micro-controller unit programming instruction execution.

Figure 3:
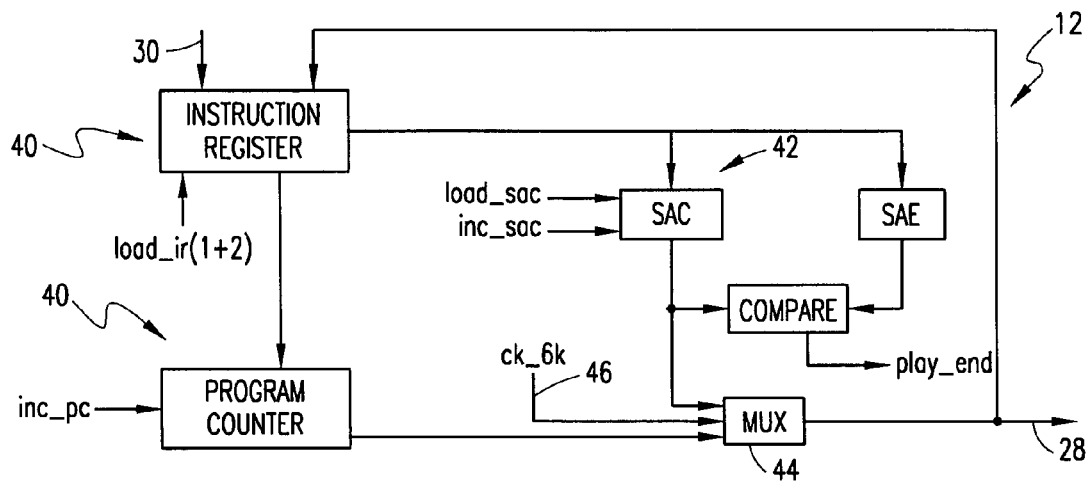
FIG. 3 is an architecture diagram illustrating a method implemented by the chip of FIG. 2 for time multiplexed ROM addressing.

Reference is now made to FIG. 3 wherein there is shown an architecture diagram illustrating a method implemented by the chip of FIG. 2 for time multiplexed ROM addressing. This method is implemented in the micro-controller unit 14. The block SAC refers to an address counter comprising the ADPCM source file data address block 42 which specifies the address applied by the micro-controller unit 14 to the ROM on bus 28 to retrieve ADPCM encoded source file data. Conversely, a PROGRAM COUNTER block and/or an INSTRUCTION REGISTER block comprise the processor instruction address block 40 which specifies the address applied by the micro-controller unit 14 to the ROM on bus 28 to retrieve user programming data. The INSTRUCTION REGISTER supplies the address to the SAC, and that address is loaded into the SAC responsive to a load SAC (load_sac) signal. As discussed above, the multiplexer 44 operating responsive to the clock signal (ck_6k) 46 chooses which specified address is actually applied by the micro-controller unit 14 on the address bus 28.

The block SAE refers to a register storing an address in the ROM comprising the end address for the located ADPCM source file data. This address is obtained from the INSTRUCTION REGISTER at the same time that the starting address is loaded into the SAC. The SAC operates to increment its register value (i.e., increment the originally loaded address) responsive to micro-controller unit application of an increment (inc_sac) signal. This signal is applied each time the micro-controller unit desires to retrieve a next portion of the stored ADPCM source file data. The block COMPARATOR implements a compare operation performed to determine whether the current register value for the. source file data address (as output from SAC following an incrementing action) matches the end address (as stored in SAE) of the source file data. When this compare operation produces a true result (i.e., when there is an address match), the COMPARATOR block outputs a play end signal (play_end). This signal indicates to the micro-controller unit 14 that the complete source file (i.e., all portions) has been retrieved from the ROM and delivered to the decoder.

Figure 4:
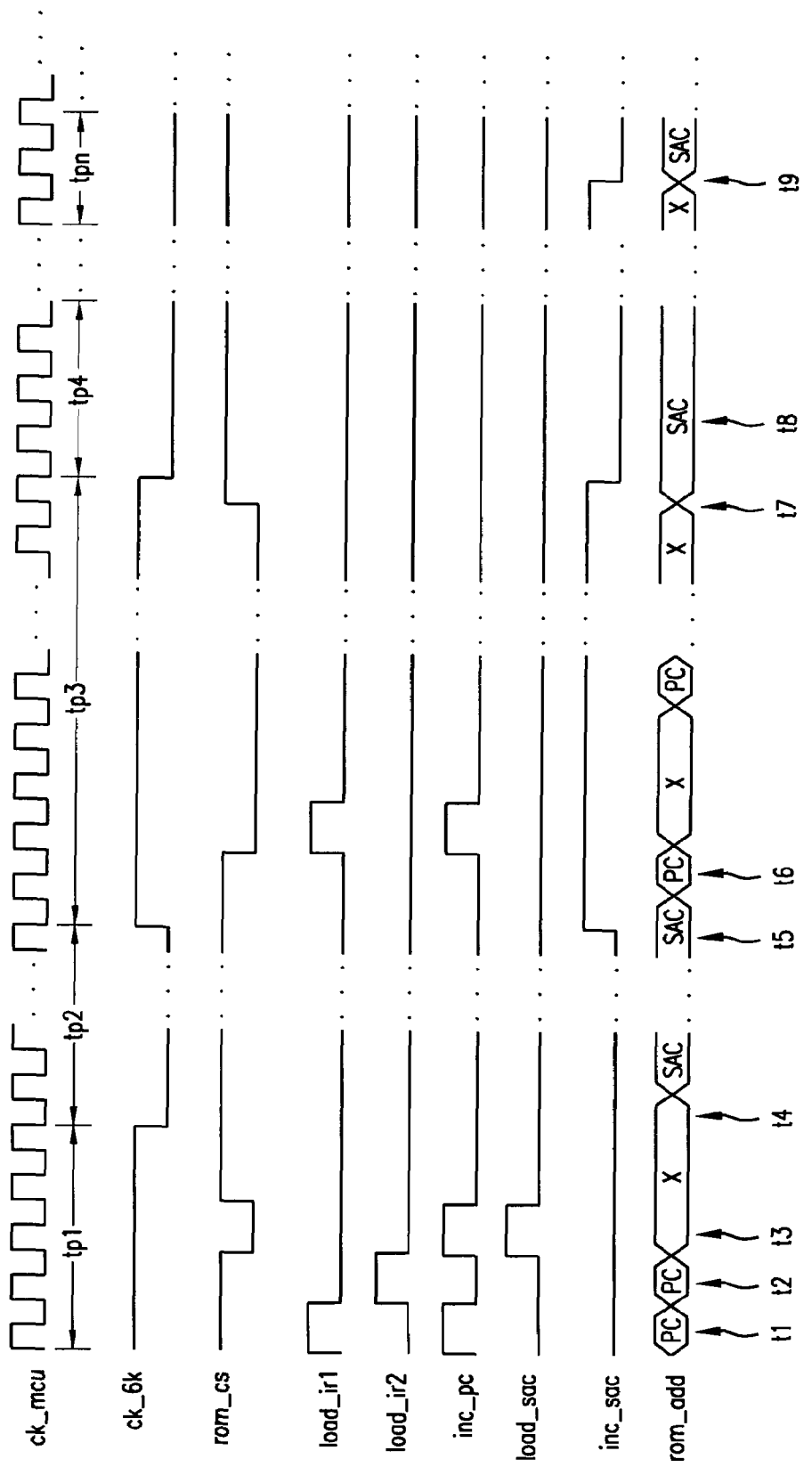
FIG. 4 is a timing diagram illustrating the implementation of the time multiplexed ROM addressing method implemented.

Reference is now additionally made to FIG. 4 wherein there is shown a timing diagram illustrating FIG. 3 architecture implementation of the time multiplexed ROM addressing method by the chip of FIG. 2. During the time period tpl, clock signal (ck_6k) 46 is logic high (the instruction phase or cycle) indicating that the processor instruction address block 40 is supplying ROM address(es) relating to stored user programming data. During time period tp2, however, clock signal (ck_6k) 46 is logic low (the decoder phase or cycle) indicating that the ADPCM source file data address block 42 is supplying ROM address(es) relating to stored pieces of the ADPCM encoded source file data. This is clock switch process is repeated through time periods tp3 to tpn. Application of the supplied ROM addresses to the ROM itself is controlled by the select signal (rom_cs) 26.

Turning specifically to time period tp1, an instruction to play a certain stored piece of ADPCM encoded source file data is executed by the micro-controller unit 14. Responsive to the instruction, the time multiplexed ROM addressing method is started. The clock signal (ck_6k) 46 is logic high at this point indicating that the processor instruction address block 40 (i.e., the PROGRAM COUNTER—PC) is supplying the ROM address (rom_add) relating to user programming data comprising a stored instruction having the following format:

PLAY=*OP*+STARTBLOCK+ENDBLOCK, wherein: OP is the opcode for the play instruction, STARTBLOCK is the address in the ROM where the first piece of the source file data is stored, and ENDBLOCK is the address in ROM where the last piece of that source file data is stored. At time t1, the STARTBLOCK first byte of the processor instruction is retrieved from the ROM at the PROGRAM COUNTER specified address and loaded into the INSTRUCTION REGISTER of the micro-controller unit 14 (see, load_ir1 signal). Next, at time t2, the program counter is incremented (through signal inc_pc) and the ENDBLOCK second byte of the processor instruction is retrieved from the ROM at the incremented PROGRAM COUNTER address and loaded into the INSTRUCTION REGISTER (see, load_ir2 signal). Note that at times t1 and t2 the ROM select signal (rom_cs) is high indicating that ROM access is occurring. At time t3, the load SAC signal (load_sac) causes the contents of the INSTRUCTION REGISTER, comprising the STARTBLOCK and ENDBLOCK, to be loaded into the SAC and SAE, respectively. For the remainder of time period tpl, the clock signal (ck_6k) 46 stays at logic high with the processor instruction address block 40 (i.e., the PROGRAM COUNTER) supplying ROM address(es) necessary for micro-controller unit 14 operation.

Turning next to time period tp2, at time t4, the clock signal (ck_6k) 46 goes logic low in accordance with the time multiplexed ROM addressing method and indicating that the ADPCM source file data address block 42 is supplying ROM address(es) relating to stored pieces of the ADPCM encoded source file data. The supplied ROM address (rom_add) at this point in time comprises the current address as specified by the SAC. Note that ROM select signal (rom_cs) is high permitting micro-controller unit access to the ROM to retrieve a portion of the stored ADPCM encoder source file. The retrieved portion is then delivered by the micro-controller unit 14 to the decoder for processing. For the remaining portion of time period tp2, the decoder operates to process (i.e., decode) the retrieved data. The increment SAC signal (inc_sac) also goes high indicating that the decoder is currently working on processing the retrieved ADPCM data.

During time period tp3, and more specifically at time t5, the clock signal (ck_6k) 46 goes back to logic high in accordance with the time multiplexed ROM addressing method and indicating that the processor instruction address block 40 (i.e., the PROGRAM COUNTER) is supplying the ROM address relating to user programming data. Note here that a byte of the processor instruction is retrieved from the ROM at the PROGRAM COUNTER specified address and loaded into the INSTRUCTION REGISTER of the micro-controller unit 14 (see, load_irl signal at time t6). The corresponding instruction is then implemented (in whole or in part) during the remainder of time period tp3, and the PROGRAM COUNTER is also incremented (see, inc_pc signal at time t6). It is important to recognize that during this time period tp3, the decoder continues to process the time period tp2 previously retrieved ADPCM encoded source file data portion. Put another way, two functions are being simultaneously (i.e., inter-mixed) performed by the chip during time period tp3: 1) the decoder implemented ADPCM decoding operation; and, 2) the micro-controller unit execution of the user programming data instruction.

Next, during time period tp4, at time t7, the clock signal (ck_6k) 46 goes logic low in accordance with the time multiplexed ROM addressing method and indicating that the ADPCM source file data address block 42 is supplying ROM address(es) (rom_add) relating to stored pieces of the ADPCM encoded source file data. When the increment SAC signal (inc_sac) goes low at time t8 responsive to completion of decoder processing of the previously retrieved ADPCM data portion, the SAC stored address value increments by one, and the supplied ROM address at this point in time comprises the incremented current address as now specified by the SAC. Note that ROM select signal (rom_cs) is high permitting micro-controller unit access to the ROM to retrieve a portion of the stored ADPCM encoder source file located at the incremented SAC address. The retrieved portion is then delivered by the micro-controller unit 14 to the decoder for processing.

For the remaining portion of time period tp4, the decoder operates to process (i.e., decode) the retrieved data. The increment SAC signal (inc_sac) also goes back high indicating that the decoder is currently working on processing the retrieved ADPCM data.

The foregoing process then repeats under the control of the clock signal (ck_6k) 46 for any additionally required time periods (for example, until tpn is reached) necessary to retrieve all portions of the stored ADPCM encoder source file from ROM and deliver them to the decoder for processing. At that point in time, the increment SAC signal (inc_sac) at time t9 will have caused the SAC to increment to a value that matches the SAE stored ENDBLOCK address. The COMPARATOR block then outputs the play end signal (play_end), the clock signal (ck_6k) 46 goes back to logic high, and the time multiplexed ROM addressing method ends. In a preferred embodiment, the clock signal (ck_6k) 46 remains at logic high until such time as a next instruction (like a PLAY instruction) is executed that requires accessing ROM stored ADPCM encoded source file data, and the time multiplexed ROM addressing method is again utilized (with a return back to tp1).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A circuit, comprising:
    a hardware-based adaptive differential pulse code modulation (ADPCM) decoder;
    a memory storing both programming instructions and ADPCM encoded source file data; and
    a micro-controller responsive to a state of a control signal to control addressing of the memory, the micro-controller operating to extract ADPCM encoded source file data from the memory for delivery to the ADPCM decoder for processing when the control signal is in a first logic state and operating to extract programming instructions from the memory for execution by the micro-controller when the control signal is in a second logic state while the hardware-based ADPCM decoder continues processing of the previously extracted ADPCM encoded source file data.

2. The circuit of claim 1 wherein the hardware-based ADPCM decoder operates to synthesize decoded output data from the extracted ADPCM encoded source file data without any processing assistance from the micro-controller.

3. The circuit of claim 2 wherein the decoded output data comprises linear pulse code modulation (PCM) format data.

4. The circuit of claim 1 wherein the architecture of the micro-controller comprises:
    a program counter that supplies a memory address for retrieving micro-controller programming instructions;
    an address counter that supplies a memory address for retrieving a portion of the ADPCM encoded source file data; and
    a multiplexer connected to the program counter and the address counter and operating to select in response to the logic state of the control signal between program counter and address counter supplied memory addresses.

5. The circuit of claim 4 wherein the control signal is driven by a two phase clock signal having a first phase for selecting the address counter and a second phase for selecting the program counter.

6. The circuit of claim 4 wherein the architecture of the micro-controller further comprises:
    a register storing an ending memory address for the ADPCM encoded source file data; and
    a comparator for comparing the address counter supplied memory address to the register ending memory address and outputting an end signal when the compared addresses match.

7. The circuit of claim 6 wherein the architecture of the micro-controller further comprises:
    means for incrementing the address counter to select over a plurality of first cycles the memory addresses necessary for retrieving all portions of the ADPCM encoded source file data for decoding.

8. The circuit of claim 1 wherein the memory comprises a read only memory (ROM).

9. The circuit of claim 1 wherein the circuit is fully implemented on an integrated circuit chip.

10. The circuit of claim 1 wherein the circuit is implemented on an integrated circuit chip.

11. A method for addressing of a memory storing both programming instructions and adaptive differential pulse code modulation (ADPCM) encoded source file data, comprising:
    extracting ADPCM encoded source file data from the memory for delivery to, and processing by, an ADPCM decoder when a control signal is in a first logic state; and
    extracting programming instructions from the memory for execution by a processor when the control signal is a second logic state and while the ADPCM decoder continues processing of previously extracted ADPCM encoded source file data.

12. The method as in claim 11 wherein extracting ADPCM encoded source file data comprises selecting an address in the memory where a portion of the ADPCM encoded source file data is stored; and wherein extracting programming instructions comprises selecting an address in the memory where each programming instruction is stored.

13. The method as in claim 12 further including providing the control signal to alternately choose between the selected ADPCM encoded source file data address and the selected programming instruction address.

14. A programming architecture for a micro-controller connected to a memory storing both programming instructions and adaptive differential pulse code modulation (ADPCM) encoded source file data, the architecture comprising:
    a program counter storing a first memory address relating to a micro-controller programming instruction;
    an address counter storing a second memory address relating to a portion of the ADPCM encoded source file data;
    a multiplexer receiving a control signal and the first and second memory addresses and operating to select the first memory address for application to the memory when the control signal is in a first logic state and select the second memory address for application to the memory when the control signal is in a second logic state.

15. The programming architecture of claim 14 wherein the control signal is a clock signal.

16. The programming architecture of claim 14 further including:
- a register storing a third memory address relating to a last portion of the ADPCM encoded source file data; and
- a comparator operating to compare the first memory address to the third memory address and output a signal indicative of reaching an end of the ADPCM encoded source file data when the addresses match.

17. The programming architecture of claim 14 further including an instruction register operating to supply the first memory address relating to a micro-controller programming instruction to the program counter and supply the second memory address relating to a portion of the ADPCM encoded source file data to the address counter.

18. The programming architecture of claim 14 further including a first increment signal applied to the address counter to increment the second memory address when the control signal is in the second logic state to consecutively access all portions of the ADPCM encoded source file data.

19. The programming architecture of claim 18 further including a second increment signal applied to the program counter to increment the first memory address when the control signal is in the first logic state to change the micro-controller programming instruction.

* * * * *